(12) United States Patent
Chuang et al.

(10) Patent No.: US 9,743,486 B2
(45) Date of Patent: Aug. 22, 2017

(54) ELECTRONIC DEVICE

(71) Applicant: E Ink Holdings Inc., Hsinchu (TW)

(72) Inventors: Kai-Cheng Chuang, Hsinchu (TW);
Cheng-Hao Lee, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 308 days.

(21) Appl. No.: 13/677,326

(22) Filed: Nov. 15, 2012

(65) Prior Publication Data

US 2013/0076249 A1 Mar. 28, 2013

Related U.S. Application Data

(63) Continuation-in-part of application No. 12/752,477, filed on Apr. 1, 2010, now abandoned.

(30) Foreign Application Priority Data

Oct. 30, 2009 (TW) .................. 98137018 A

(51) Int. Cl.
*G09G 3/34* (2006.01)
*H05B 37/02* (2006.01)
*G09F 13/04* (2006.01)
*G06F 1/16* (2006.01)
*G06F 1/32* (2006.01)
(Continued)

(52) U.S. Cl.
CPC .......... *H05B 37/02* (2013.01); *G02B 6/0076* (2013.01); *G06F 1/1616* (2013.01); *G06F 1/1624* (2013.01); *G06F 1/1626* (2013.01); *G06F 1/1647* (2013.01); *G06F 1/1694* (2013.01); *G06F 1/3203* (2013.01); *G06F 1/3265* (2013.01); *G09F 13/04* (2013.01); *G09G 3/342* (2013.01); *G02B 6/0063* (2013.01); *G02F 1/13* (2013.01); *G02F 1/1391* (2013.01); *G02F 1/133615* (2013.01); *G02F 1/167* (2013.01); *G06F 3/1423* (2013.01); *G09G 3/3406* (2013.01); *G09G 2300/0473* (2013.01); *G09G 2360/04* (2013.01); *G09G 2360/144* (2013.01); *H04M 1/0214* (2013.01); *H04M 1/0225* (2013.01); *H04M 1/0235* (2013.01); *H04M 2250/16* (2013.01); *H04W 52/027* (2013.01); *Y02B 60/1242* (2013.01); *Y02B 60/50* (2013.01)

(58) Field of Classification Search
CPC G09G 5/00; G09G 3/002; G09G 3/06; G09G 2300/26; G06F 3/0325
See application file for complete search history.

(56) References Cited

U.S. PATENT DOCUMENTS 7,223,007 B1* 5/2007 Fredley ................ G02B 6/0076
362/602
7,237,939 B2* 7/2007 Kim ..................... G02B 6/0055
362/616
(Continued)

FOREIGN PATENT DOCUMENTS

TW I309711 5/2009

*Primary Examiner* — Kent Chang
*Assistant Examiner* — William Lu
(74) *Attorney, Agent, or Firm* — Jianq Chyun IP Office

(57) ABSTRACT

An electronic device including a body and a light source module is provided. The body has a side on which an unstable display is disposed and another side on which a bi-stable display is disposed. The light source module is arranged inside the body and configured to provide a light source to one or none of the unstable display and the bi-stable display.

26 Claims, 7 Drawing Sheets

(51) Int. Cl.
   *H04M 1/02*      (2006.01)
   *H04W 52/02*     (2009.01)
   *G06F 3/14*      (2006.01)
   *G02F 1/13*      (2006.01)
   *G02F 1/1335*    (2006.01)
   *G02F 1/139*     (2006.01)
   *G02F 1/167*     (2006.01)
   *F21V 8/00*      (2006.01)

(56) References Cited

U.S. PATENT DOCUMENTS

| | | | | |
|---|---|---|---|---|
| 8,173,921 | B2* | 5/2012 | Watanabe | H01H 13/83 200/311 |
| 8,810,524 | B1* | 8/2014 | Rosenberg | G06F 1/1643 345/1.1 |
| 2001/0050373 | A1* | 12/2001 | Yamazaki | H01L 51/5016 257/103 |
| 2002/0060772 | A1* | 5/2002 | Umemoto | G02B 6/0053 349/158 |
| 2002/0167488 | A1* | 11/2002 | Hinckley et al. | 345/156 |
| 2003/0085870 | A1* | 5/2003 | Hinckley | 345/156 |
| 2003/0210360 | A1* | 11/2003 | Yoshida | G02F 1/13362 349/96 |
| 2004/0061684 | A1* | 4/2004 | Tortola | 345/169 |
| 2004/0062027 | A1* | 4/2004 | Kim et al. | 362/31 |
| 2004/0113162 | A1* | 6/2004 | Mai | 257/88 |
| 2005/0024844 | A1* | 2/2005 | Oh | 362/31 |
| 2005/0040753 | A1* | 2/2005 | Osame et al. | 313/500 |
| 2005/0195344 | A1* | 9/2005 | Chang et al. | 349/114 |
| 2006/0034042 | A1* | 2/2006 | Hisano et al. | 361/681 |
| 2006/0066783 | A1* | 3/2006 | Sampsell | G02B 26/001 349/114 |
| 2006/0121961 | A1* | 6/2006 | Cho | G02B 6/0076 455/575.3 |
| 2006/0250762 | A1* | 11/2006 | Yang et al. | 361/681 |
| 2008/0068292 | A1* | 3/2008 | Yuan et al. | 345/2.1 |
| 2008/0108393 | A1* | 5/2008 | Kim | 455/566 |
| 2008/0146289 | A1* | 6/2008 | Korneluk et al. | 455/569.1 |
| 2008/0267572 | A1* | 10/2008 | Sampsell et al. | 385/129 |
| 2009/0102745 | A1* | 4/2009 | Chan | G09G 5/00 345/1.3 |
| 2009/0231268 | A1* | 9/2009 | Yamada | 345/107 |
| 2010/0067092 | A1* | 3/2010 | Los | G02B 26/004 359/290 |
| 2010/0156913 | A1* | 6/2010 | Ortega et al. | 345/520 |

* cited by examiner

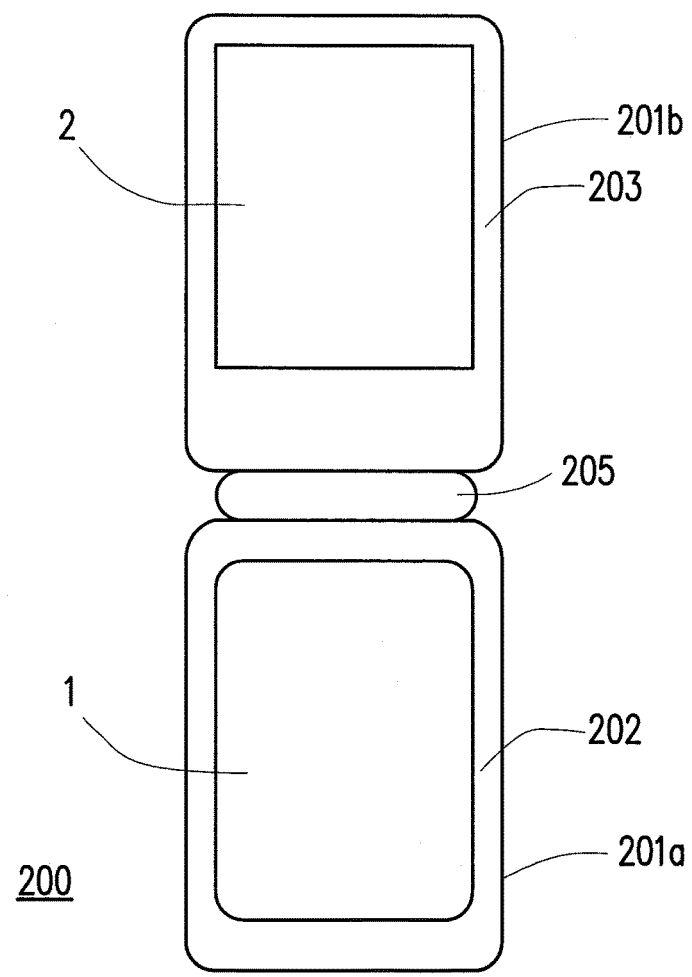
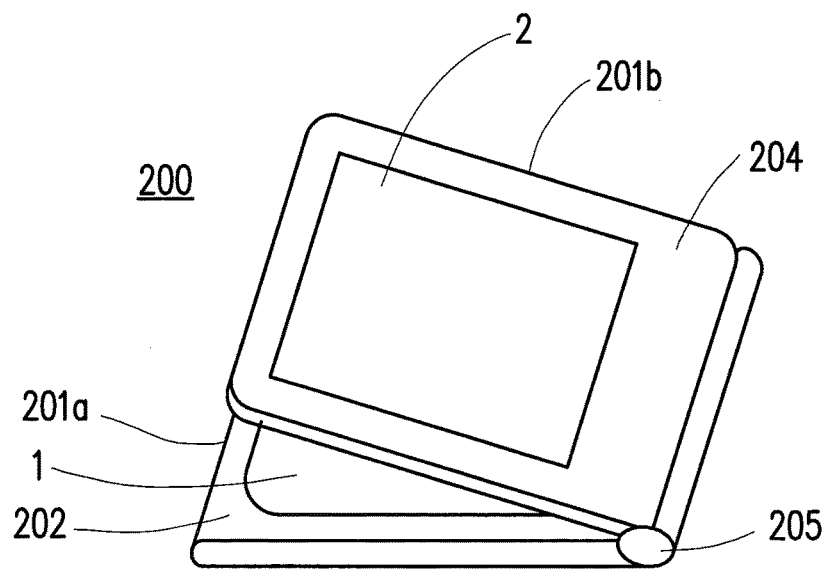
FIG. 2A
FIG. 2B

ELECTRONIC DEVICE

CROSS-REFERENCE TO RELATED APPLICATION

This application is a continuation-in-part application of and claims the priority benefit of a prior application Ser. No. 12/752,477, filed on Apr. 1, 2010, now pending. The prior application Ser. No. 12/752,477 claims the priority benefit of Taiwan application serial no. 098137018, filed on Oct. 30, 2009. The entirety of each of the above-mentioned patent applications is hereby incorporated by reference herein and made a part of this specification.

BACKGROUND OF THE DISCLOSURE

Field of the Disclosure

The disclosure relates to an electronic device having multiple screens. More particularly, the disclosure relates to an electronic device having an unstable display and a bi-stable display.

Description of Related Art

With the rapid development of the electronic technology, various portable electronic products, such as personal digital assistances (PDA), electronic books, cell phones and the like, have been invented to satisfy versatile demands for human's lives and entertainments. Such portable electronic products are mainly designed to display data, characters and graphs.

While designing of these portable electronic products, designers tend to configure multiple flat displays in a single electronic product. However, since each display consumes significant power, the electronic product equipped with a plurality of screens must become power-consuming.

Taiwan Patent No. 1309711 discloses a satellite global positioning system (GPS) device having multiple screens. Please refer to FIG. 5, which is a diagram illustrating the representative drawing for Taiwan Patent No. 1309711. The satellite GPS 500 in FIG. 5 has a first host 110 and a second host 130 which are connected to each other by a pivot 140. In order to demonstrate much more information, a first liquid crystal display (LCD) 120 and a second LCD 150 are respectively disposed on the first host 110 and the second host 130. However, since it consumes considerable battery power for driving the first LCD 120 and the second LCD 150, while the satellite GPS 500 is used for displaying same contents or static contents for a long period, it becomes energy-consuming and environment-harming.

SUMMARY OF THE DISCLOSURE

The disclosure provides an electronic device having multiple screens in combination with a bi-stable display and an unstable display. Since a bi-stable display is integrated in the device, the screen of the device is capable of demonstrating specific contents for a long period without power supply. Therefore, the mentioned electronic device can distribute static displaying contents or contents that need to be demonstrated for a long time to be shown on the bi-stable display, to significantly reduce the power consuming for prevent harming environment at the same time. Furthermore, the bi-stable display of the electronic device equipped with multiple screens disclosed in the disclosure can be utilized as an identification after configured appropriately.

In accordance with the first aspect of the disclosure, an electronic device is provided. The electronic device includes a body and a light source module. The body has a side on which an unstable display is disposed and another side on which a bi-stable display is disposed. The light source module is arranged inside the body and configured to provide a light source to one or none of the unstable display and the bi-stable display.

In an embodiment of the disclosure, the light source module is selectively arranged on the another side on which the bi-stable display is disposed for providing the light source to the bi-stable display or between the unstable display and the bi-stable display for providing the light source to the unstable display.

In an embodiment of the disclosure, the light source module includes a first and a second light guide planes and a first light emitting device. The first and the second light guide planes are respectively arranged on the side on which the unstable display is disposed and between the unstable display and the bi-stable display for receiving the light source. The first light emitting device is configured to provide the light source to one of the first and the second light guide planes.

In an embodiment of the disclosure, the light source module further includes a first and a second switchable light shelters. The first and the second switchable light shelters are respectively arranged between the first light emitting device and the first light guide plane and between the first light emitting device and the second light guide plane.

In an embodiment of the disclosure, the light source module further includes a second light emitting device. The second light emitting device is configured to provide the light source to the other one of the first and the second light guide planes.

In an embodiment of the disclosure, the electronic device further includes a light control module. The light control module is arranged inside the body. The light control module is configured to sense which one of the unstable display and the bi-stable display a user operates. The light control module is configured to control the light source module to provide the light source to the one or none of the unstable display and the bi-stable display operated by the user.

In an embodiment of the disclosure, the light control module includes a first sensor and a controller. The first sensor is disposed on the another side on which the bi-stable display is disposed and configured to sense an ambient light. The controller is electrically connected to the first sensor. The controller is configured to determine whether the light source module provides the light source to the bi-stable display operated by the user according to the sensing result of the first sensor.

In an embodiment of the disclosure, the light control module further includes a mode setting unit. The mode setting unit is electrically connected to the controller and configured to set the electronic device to operate in a first mode or a second mode. In the first mode, the unstable display faces away from a gravity direction, and in the second mode, the bi-stable faces away from the gravity direction.

In an embodiment of the disclosure, the light control module further includes a second sensor. The second sensor is disposed on the side on which the unstable display is disposed and configured to detect a direction perpendicular to the unstable display with respect to the gravity direction. The controller is further electrically connected to the second sensor. The controller is configured to control the light source module to provide the light source to the one of the unstable display and the bi-stable display operated by the user according to the detecting result of the second sensor.

In an embodiment of the disclosure, the light control module further includes a third sensor. The third sensor is disposed on the another side on which the bi-stable display is disposed and configured to detect a direction perpendicular to the bi-stable display with respect to the gravity direction. The controller is further electrically connected to the third sensor. The controller is configured to control the light source module to provide the light source to the one of the unstable display and the bi-stable display operated by the user according to the detecting result of the third sensor.

In an embodiment of the disclosure, the light control module further includes a fourth sensor. The fourth sensor is disposed on the side on which the unstable display is disposed and configured to sense whether the unstable display is operated by the user. The first sensor is further configured to sense whether the bi-stable display is operated by the user. The controller is further electrically connected to the fourth sensor. The controller is configured to control the light source module to provide the light source to the one or none of the unstable display and the bi-stable display operated by the user according to the detecting result of the first sensor or the fourth sensor.

In an embodiment of the disclosure, the electronic device further includes a switching element configured on the body and switching the unstable display and the bi-stable display to operate between a synchronization mode and a non-synchronization mode.

In an embodiment of the disclosure, the body further has an electronic computing module therein.

In an embodiment of the disclosure, the electronic computing module further includes a processor processing a received data and a storing medium storing one of the received data and a processed data.

In an embodiment of the disclosure, the another side is one of an opposite side opposite to the side and an edge side beside to the side.

In an embodiment of the disclosure, the bi-stable display is one selected from a group consisting of a bi-stable liquid crystal display, a micro-electro-mechanical system display, an electrophoretic display, a reflective-display, an electrowetting display, an electronic paper and a combination thereof.

In an embodiment of the disclosure, the unstable display is one selected from a group consisting of an unstable liquid crystal display, an organic light emitting diode display, a plasma display and a combination thereof.

In an embodiment of the disclosure, each of the bi-stable display and the unstable display is one selected from a group consisting of a touch-based display, a flexible display and a soft display.

In an embodiment of the disclosure, the electronic device is one selected from a group consisting of a notebook computer, a digital camera, a personal digital assistance, a global positioning system, an electronic book, a mobile communication equipment, a audio-video player, a portable electronic device, a miniature computing device, a digitalized processing device and a handheld electronic device.

In accordance with the second aspect of the disclosure, an electronic device is provided. The electronic device including a first body having a first surface disposing thereon a first unstable display; a second body rotatably connected with the first body and having a second surface disposing thereon a first bi-stable display; and a light source module arranged beside the first and the second bodies and configured to provide a light source to one or none of the first unstable display and the first bi-stable display.

In an embodiment of the disclosure, the light source module are selectively arranged on the second surface for providing the light source to the first bi-stable display or between the first unstable display and the first bi-stable display for providing the light source to the first unstable display.

In an embodiment of the disclosure, the light source module includes a first and a second light guide planes and a first light emitting device. The first and the second light guide planes are respectively arranged on the second surface and between the first unstable display and the first bi-stable display for receiving the light source. The first light emitting device is configured to provide the light source to one of the first and the second light guide planes.

In an embodiment of the disclosure, the light source module further includes a first and a second switchable light shelters. The first and the second switchable light shelters are respectively arranged between the first light emitting device and the first light guide plane and between the first light emitting device and the second light guide plane.

In an embodiment of the disclosure, the light source module further includes a second light emitting device. The second light emitting device is configured to provide the light source to the other one of the first and the second light guide planes.

In an embodiment of the disclosure, the electronic device further includes a light control module. The light control module is configured to sense which one of the first unstable display and the first bi-stable display a user operates. The light control module is configured to control the light source module to provide the light source to the one or none of the first unstable display and the first bi-stable display operated by the user.

In an embodiment of the disclosure, the light control module includes a first sensor and a controller. The first sensor is disposed on the second surface and configured to sense an ambient light. The controller is electrically connected to the first sensor. The controller is configured to determine whether the light source module provides the light source to the first bi-stable display operated by the user according to the sensing result of the first sensor.

In an embodiment of the disclosure, the light control module further includes a mode setting unit. The mode setting unit is electrically connected to the controller and configured to set the electronic device to operate in a first mode or a second mode. In the first mode, the first unstable display faces away from a gravity direction, and in the second mode, the first bi-stable display faces away from the gravity direction.

In an embodiment of the disclosure, the light control module further includes a second sensor. The second sensor is disposed on the first body and configured to detect a direction perpendicular to the first unstable display with respect to the gravity direction. The controller is further electrically connected to the second sensor. The controller is configured to control the light source module to provide the light source to the one of the first unstable display and the first bi-stable display operated by the user according to the detecting result of the second sensor.

In an embodiment of the disclosure, the light control module further includes a third sensor. The third sensor is disposed on the second body and configured to detect a direction perpendicular to the first bi-stable display with respect to the gravity direction. The controller is further electrically connected to the third sensor. The controller is configured to control the light source module to provide the light source to the one of the first unstable display and the first bi-stable display operated by the user according to the detecting result of the third sensor.

In an embodiment of the disclosure, the light control module further includes a fourth sensor. The fourth sensor is disposed on the first surface and configured to sense whether the first unstable display is operated by the user. The first sensor is further configured to sense whether the first unstable display is operated by the user. The controller is further electrically connected to the fourth sensor. The controller is configured to control the light source module to provide the light source to the one or none of the first unstable display and the first bi-stable display operated by the user according to the detecting result of the first sensor or the fourth sensor.

In an embodiment of the disclosure, the second body is electrically connected with the first body.

In an embodiment of the disclosure, the second body further includes a third surface opposite to the second surface disposing thereon one of a second unstable display and a second bi-stable display.

In an embodiment of the disclosure, one of the first and the second bi-stable displays is configured as an identification.

In an embodiment of the disclosure, the electronic device is one of a foldable electronic device or a twistable electronic device.

In an embodiment of the disclosure, the foldable electronic device is a foldable mobile phone and the twistable electronic device is a twistable mobile phone.

In an embodiment of the disclosure, the electronic device further includes a rotating mechanism. The rotating mechanism rotatably connects the first body and the second body. The first light emitting device is arranged inside the rotating mechanism.

In an embodiment of the disclosure, the first and the second light emitting devices are arranged inside the rotating mechanism.

In order to make the aforementioned and other features and advantages of the disclosure comprehensible, several exemplary embodiments accompanied with figures are described in detail below.

BRIEF DESCRIPTION OF THE DRAWINGS

Reference will now be made in detail to the present preferred embodiments of the disclosure, examples of which are illustrated in the accompanying drawings. Wherever possible, the same reference numbers are used in the drawings and the description to refer to the same or like parts.

FIGS. 2A and 2B are diagrams illustrating a second embodiment of the electronic device according to the disclosure.

DESCRIPTION OF EMBODIMENTS

The disclosure will now be described more specifically with reference to the following embodiments. It should be noted that the following descriptions of exemplary embodiments of this disclosure are presented herein for purposes of illustration and description only. It is not intended to be exhaustive or to be limited to the precise form disclosed.

An unstable display refers to a displaying device that continues displaying contents under condition that electric power is continuously supplying thereto. Once the electric power is disconnected, the contents showing on the screen of the unstable display disappears. A bi-stable display refers a displaying device that is capable of displaying contents on the screen for quite a period while even electric power does not supply thereto. Once the electric power is disconnected, the contents showing on the screen of the unstable display disappears. For the bi-stable display, the electric power is used for driving the electrophoresis particles to update the displaying contents. For the bi-stable display, when the electric power is shut down, the displaying contents stay in the last updated contents. Usually, when no power is supplied to the bi-stable display, the bi-stable display may be capable of displaying unvaried contents for lasting almost one month, which is suitable for a demand displaying static contents or an application occasion that needs a long-term demonstration.

Typically, a bi-stable display may be a bi-stable liquid crystal display (LCD), a micro-electro-mechanical system (MEMS) display, an electrophoretic display (EPD), a reflective-display, an electrowetting display or an electronic paper. A stable display may be an unstable LCD, an organic light emitting diode (OLED) display or a plasma display. At the same time, the mentioned bi-stable display and the unstable display may be a touch-based display having a touch panel disposed thereon, a flexible display or a soft display.

Figure 1A:
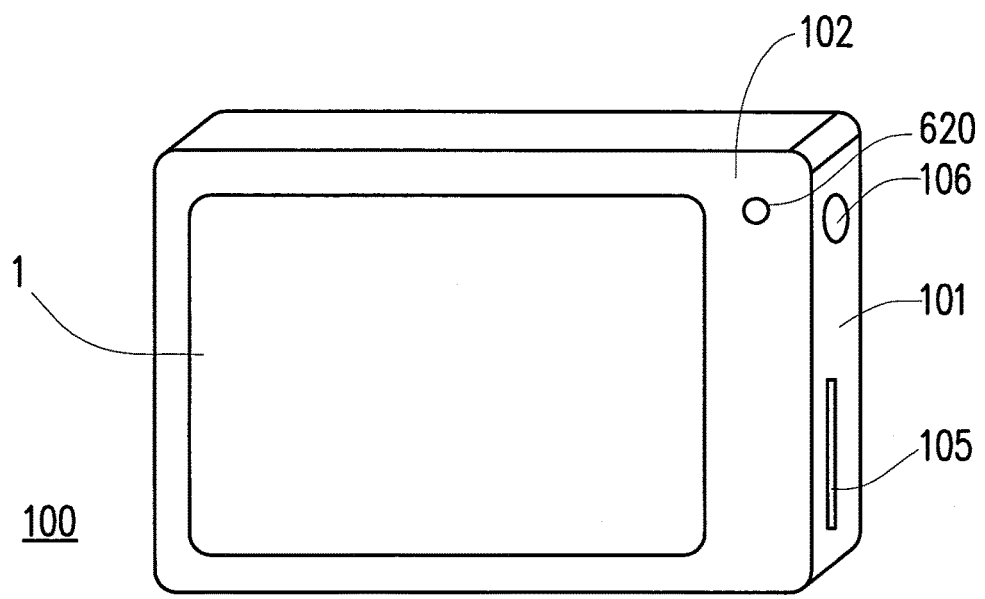
FIGS. 1A and 1B are diagrams illustrating a first embodiment of the electronic device according to the disclosure.
Figure 1B:
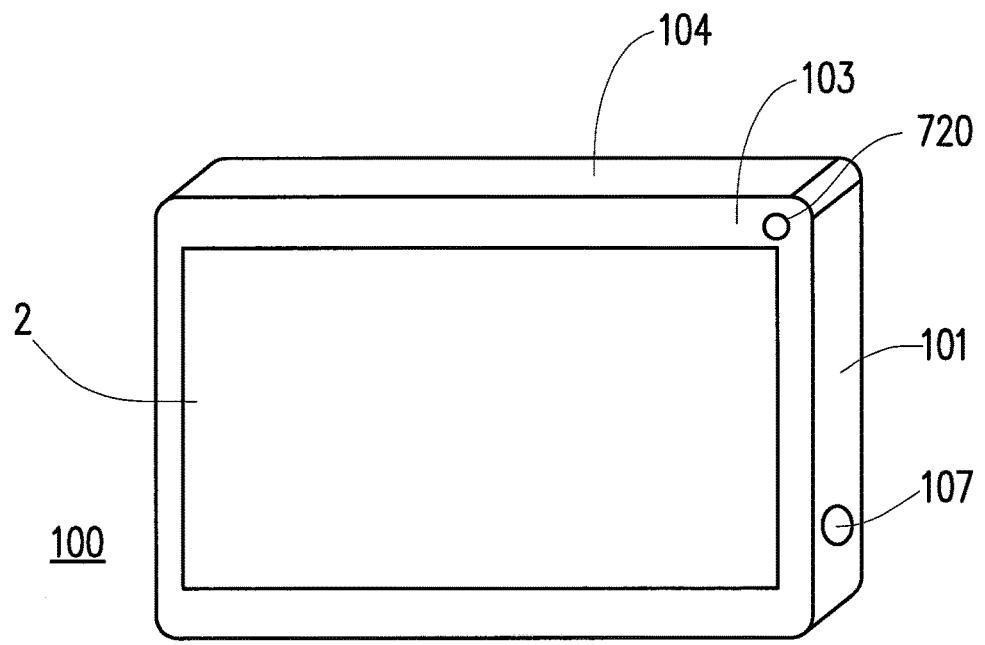

Please simultaneously direct to FIGS. 1A and 1B, which are diagrams illustrating a first embodiment of the electronic device according to the disclosure. The electronic device 100 in FIG. 1 may be a notebook (NB) computer, a digital camera (DC), a personal digital assistance (PDA), a global positioning system (GPS), an electronic book (e-book), a mobile communication equipment, an audio-video player, a portable electronic device, a miniature computing device, a digitalized processing device or a handheld electronic device, in which a digital processing module is disposed. The fundamental architecture of the mentioned digital processing module in the electronic device 100 includes at least a central processing unit (CPU, not shown in FIGs.), at least a storing medium (not shown in FIGs.) at least one set of input/output component and a power unit. The CPU is used for receiving and processing data, and the storing medium is used for storing the received data or processed data. Basically, the connecting and operating relationships among the above-mentioned components are well known by a person skilled in the art.

A host 101 of the electronic device 100 has a first side 102 and a second side 103 opposite to the first side 102. An unstable display 1 is disposed on the first side 102 and a bi-stable display 2 is disposed on the second side 103. The unstable display 1 disposed on the first side 102 is commonly suitable for displaying dynamic contents and the bi-stable display 2 disposed on the second side 103 is commonly suitable for displaying static contents. For instance, while the electronic device 100 may be a GPS, the unstable display 1 on the first side 102 is suitable for displaying a digital map having much dynamic displaying contents since the map is dynamically altered in response to movement of a user. The bi-stable display 2 on the second side 103 is used for displaying for instance an email or an e-book having much static displaying contents. Specifically, the user can directly utilize such GPS having two screens to obtain a real-time geographic road information by an LCD on the first side and read e-mail or e-book by the EPD on the second side simultaneously. Additionally, the electronic device 100 could be a handheld digital television player, where an LCD on front side is used for playing TV program and an EPD on back side is used for displaying e-mail or e-book simultaneously.

The host 101 of the electronic device 100 further includes a switch 106 for switching the unstable display 1 and the bi-stable display 2 to operate between a synchronization mode and a non-synchronization mode. While a synchronization mode is switched, the displaying contents on the respective unstable display 1 and bi-stable display 2 are associated to become an integration and have continuity and association therebetween. While a non-synchronization mode is switched, the displaying contents on the respective unstable display 1 and bi-stable display 2 are irrelevant and have no continuity and association therebetween. It is noted that the bi-stable display 2 can be disposed on the lateral side 104 of the host 101. Several function components such as, an expansion slot 105 and an ear phone socket 107, may be further disposed on the host 101.

Furthermore, the host 101 of the electronic device 100 further includes a light source module for providing a light source to one of the unstable display 1 and the bi-stable display 2. Please further direct to FIG. 1C, which is a diagram illustrating a first embodiment of the light source module according to the disclosure. In this embodiment, the light source module 610 is separable from the host 101. The light source module 610 is selectively arranged on the side on which the unstable display 1 is disposed for providing the light source to the unstable display 1. Alternatively, the light source module 610 may be arranged between the unstable display 1 and the bi-stable display 2 for providing the light source to the bi-stable display 2.

Specifically, the host 101 has two spaces S1 and S2 each for containing the light source module 610. In the present embodiment, a user may choose to use the unstable display 1 or the bi-stable display 2 based on practical requirements. When the bi-stable display 2 is used, the user can put the light source module 610 into the space S1. In this case, the light source module 610 serves as a front-light module and is configured to provide the light source to the bi-stable display 2 for operation. However, if an ambient light is strong enough, the user may optionally turn on or off the light source module 610 when the bi-stable display 2 is used. Once the light source module 610 is turned off, the light source module 610 provides the light source to none of the unstable display 1 and the bi-stable display 2. Accordingly, a photo sensor 720 disposed on the side on which the bi-stable display 2 is disposed may be necessary for sensing the ambient light in the present embodiment, but the disclosure is not limited thereto. In another embodiment, the user may feel the ambient light and determines whether to turn on the light source module 610. In addition, the photo sensor 720 may be replaced by a complementary metal oxide semiconductor (CMOS) image sensor. By contrast, when the unstable display 1 is used, the user can put the light source module 610 into the space S2. In this case, the light source module 610 serves as a back-light module and is configured to provide the light source to the unstable display 1 for operation. Furthermore, in order to enhance the efficiency of the back-light module, a reflector 617 may be arranged between the bi-stable display 2 and the space S2 to reflect the light source to the unstable display 1.

In this embodiment, the light source module 610 is manufactured independently and slidably connected with the host 101 by sliding structures 613, but the disclosure is not limited thereto. The light source module 610 includes a light emitting device 612 and a light guide plane 614. The light emitting device 612 is located beside the light guide plane 614 and provides the light source to the light guide plane 614. The light guide plane 614 receives the light source and provides a uniform light source to the unstable display 1 or the bi-stable display 2.

Figure 1C:
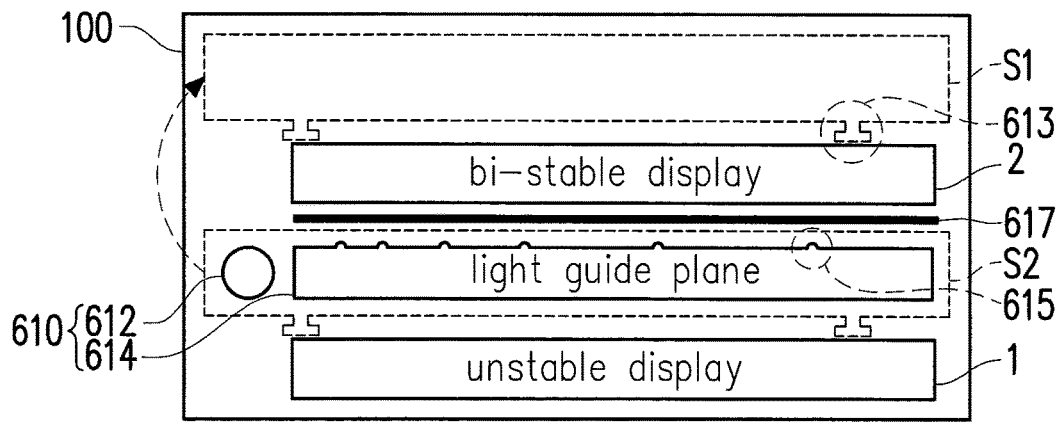
FIG. 1C is a diagram illustrating a first embodiment of the light source module according to the disclosure.

In the present embodiment, the light guide plane 614 has optical microstructures 615 for uniforming the light source provided by the light emitting device 612. The optical microstructures 615 may be separated from one another and distribute in a variable density as shown in FIG. 1C. In another embodiment, the optical microstructures 615 may distribute in a constant density or continuously distribute on the surface of the light guide plane 614. In addition, the optical microstructures 615 may be cambered structures or prismatic structures protruding out of the surface of the light guide plane 614.

Figure 1D:
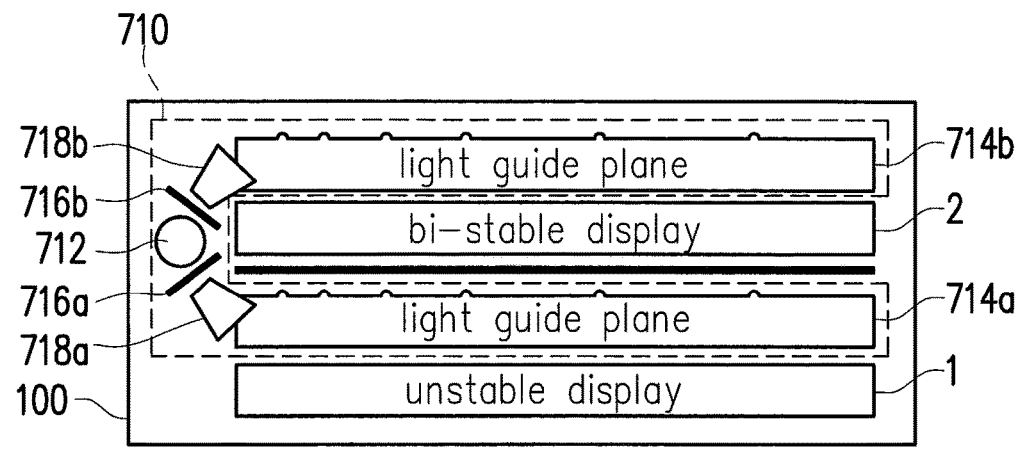
FIG. 1D is a diagram illustrating a second embodiment of the light source module according to the disclosure.

Please further direct to FIG. 1D, which is a diagram illustrating a second embodiment of the light source module according to the disclosure. In this embodiment, the light source module 710 includes a single light emitting device 712, a first and a second light guide planes 714a and 714b, a first and a second switchable light shelters 716a and 716b, and a first and a second diffusers 718a and 718b. Herein, the first and the second switchable light shelters 716a and 716b may be apertures or other light control elements controlled by the micro-electro-mechanical systems (MEMS) technology, and are configured to determine whether to allow the light source passing through.

In the present embodiment, the user may also choose to use the unstable display 1 or the bi-stable display 2 based on practical requirements. When the unstable display 1 is used, the first switchable light shelter 716a is switched to allow the light source passing through and transmitting to the first light guide plane 714a via the first diffuser 718a. In this case, the light source module 710 serves as the back-light module and is configured to provide the light source to the unstable display 1 for operation. If necessary, a CMOS image sensor 620 or a gyroscope may be arranged on the side on which the unstable display 1 is disposed. The CMOS image sensor 620 is configured to sense the face of the user to determine whether the unstable display 1 is used. For the gyroscope, it can detect the direction perpendicular to the unstable display 1 with respect to the gravity direction and determine whether the unstable display 1 is used by the user based on the detection result.

By contrast, when the bi-stable display 2 is used, the second switchable light shelter 716b is switched to allow the light source passing through and transmitting to the second light guide plane 714b via the second diffuser 718b. In this case, the light source module 710 serves as the front-light module and is configured to provide the light source to the bi-stable display 2 for operation. Similar to the side on which the unstable display 1 is disposed, a CMOS image sensor or a gyroscope may be arranged on the side on which the bi-stable display 2 is disposed, and it will not be described again herein. It should be noted that if the CMOS image sensor is arranged on the side on which the bi-stable display 2 is disposed, the CMOS image sensor is further configured to sense the ambient light. For this embodiment, the CMOS image sensor can be replaced by a photo sensor. If the ambient light is strong enough, the user may optionally turn on or off the light source module 710 when the bi-stable display 2 is used.

Figure 1E:
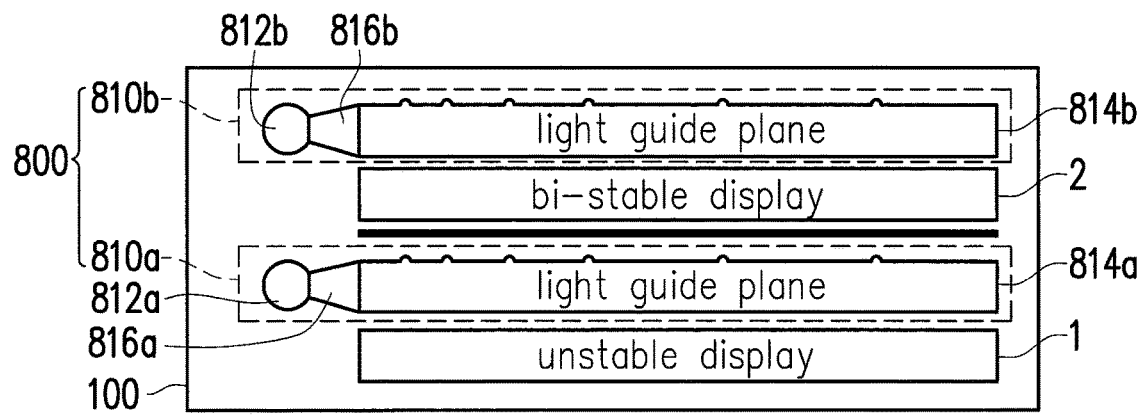
FIG. 1E is a diagram illustrating a third embodiment of the light source module according to the disclosure.

Please further direct to FIG. 1E, which is a diagram illustrating a third embodiment of the light source module according to the disclosure. In this embodiment, the light source module 800 includes two submodules 810a and 810b. Each of the two submodules 810a and 810b includes a light emitting device, a light guide plane, and a diffuser.

In the present embodiment, the user may also choose to use the unstable display 1 or the bi-stable display 2 based on practical requirements. When the unstable display 1 is used, the submodule 810a is enabled and thus serves as the back-light module. In this case, the light source module 800 is configured to provide the light source to the unstable display 1 for operation. That is to say, the light emitting device 810a provides the light source to the light guide plane 814a via the first diffuser 816a. By contrast, when the bi-stable display 2 is used, the submodule 810b is enabled, and thus the light emitting device 812b provides the light source to the second light guide plane 814b via the second diffuser 816b. In this case, the submodule 810b serves as the front-light module and is configured to provide the light source to the bi-stable display 2 for operation.

On the basis of the above-mentioned embodiments of the light source modules, at least one embodiment of a control scheme for controlling the light source modules is correspondingly derived. Please further direct to FIG. 1F, which is a block diagram illustrating a first embodiment of the control scheme according to the disclosure. In this embodiment, the electronic device 900 includes a light control module 901 arranged inside the host thereof. The light control module 901 is configured to sense which one of the unstable display 1 and the bi-stable display 2 a user operates and control the light source module 920 to provide the light source to the one or none of the unstable display 1 and the bi-stable display 2 operated by the user. The light control module 901 includes a controller 910 electrically connected to sensors 950 and 960. The controller 910 is configured to control the light source module 920 to provide the light source to which one of the unstable display 1 and the bi-stable display 2 according to the sensing results of the sensors 950 and 960.

Specifically, the sensors 950 and 960 may be respectively implemented by CMOS image sensors in the present embodiment. One of the sensors 950 and 960 is arranged on the side on which the unstable display 1 is disposed, and the other one of the sensors 950 and 960 is arranged on the side on which the bi-stable display 2 is disposed. The CMOS image sensors are configured to sense the face of the user to determine which one of the unstable display 1 and the bi-stable display 2 is used. If the unstable display 1 is used by the user, the controller 910 controls the light source module 920 to provide the light source to the unstable display 1 according to the sensing result of the CMOS image sensor which is arranged on the side on which the unstable display 1 is disposed. If the bi-stable display 2 is used by the user, the controller 910 controls the light source module 920 to provide the light source to the bi-stable display 2 according to the sensing result of the CMOS image sensor which is arranged on the side on which the bi-stable display 2 is disposed. It should be noted that if the ambient light is strong enough, the light source may be unnecessary for the bi-stable display 2. The controller 910 may turn off the light source module 920 even if the bi-stable display 2 is used. In the meantime, the light source module 920 provides the light source to none of the unstable display 1 and the bi-stable display 2.

Figure 1F:
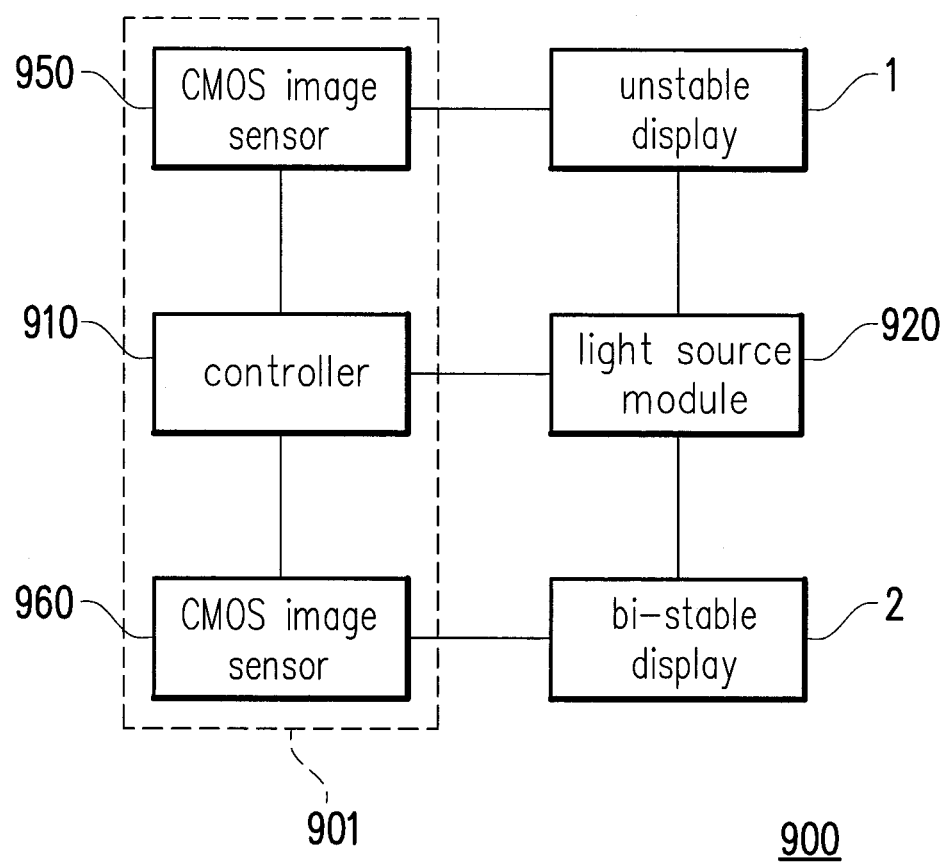
FIG. 1F is a block diagram illustrating a first embodiment of the control scheme according to the disclosure.

In the control scheme as exemplarily shown in FIG. 1F, the sensors 950 and 960 are respectively implemented by the CMOS image sensors for example. However, the disclosure is not limited thereto. The sensors may be implemented by a photo sensor and a gyroscope respectively in another embodiment.

Figure 1G:
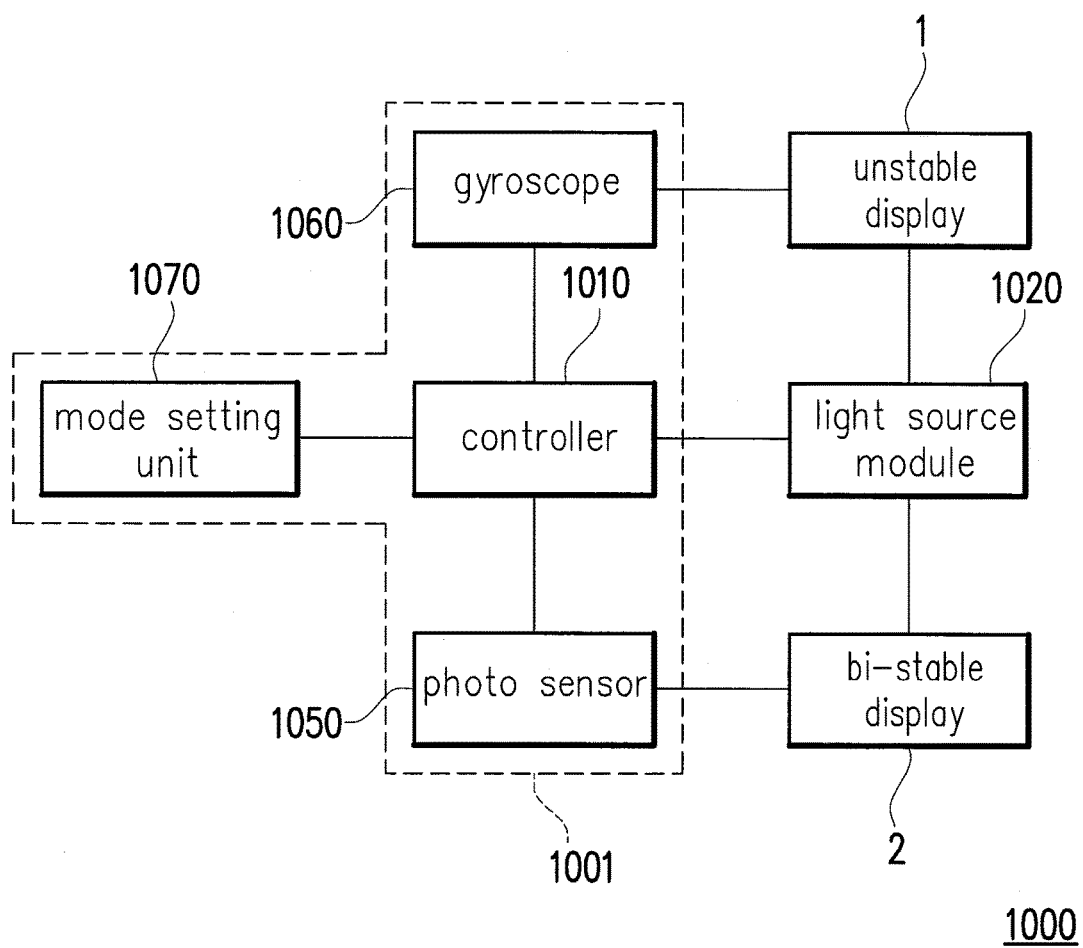
FIG. 1G is a block diagram illustrating a second embodiment of the control scheme according to the disclosure.

Please further direct to FIG. 1G, which is a block diagram illustrating a second embodiment of the control scheme according to the disclosure. In this embodiment, the sensors 1050 and 1060 are respectively implemented by a photo sensor and a gyroscope. The photo sensor 1050 is arranged on the side on which the bi-stable display 2 is disposed for sensing the ambient light. The controller 1010 determines whether the light source module 1020 provides the light source to the bi-stable display 2 based on the sensing result of the photo sensor 1050.

On the other hand, the gyroscope 1060 may be arranged either on the side on which the unstable display 1 is disposed or on the side on which the bi-stable display 2 is disposed for detecting which one of the unstable display 1 and the bi-stable display 2 the user operates. The gyroscope 1060 is configured to detect a direction perpendicular to the unstable display 1 with respect to the gravity direction or a direction perpendicular to the bi-stable display 2 with respect to the gravity direction. For proper operation, the light control module 1001 further includes a mode setting unit 1070. The mode setting unit 1070 is electrically connected to the controller 1010 and configured to set the electronic device 1000 to operate in a first mode or a second mode. In the first mode, the unstable display 1 faces away from the gravity direction, and the bi-stable display 2 faces toward the gravity direction. The user may lie face-down on a bed, sit or stand while operating the unstable display 1 in the first mode. Alternatively, the user may lie face-up on the bed while operating the bi-stable display 2 in the first mode. In the second mode, the bi-stable display 2 faces away from the gravity direction, and the unstable display 1 faces toward the gravity direction. The user may lie face-down on the bed, sit or stand while operating the bi-stable display 2 in the second mode. Alternatively, the user may lie face-up on the bed while operating the unstable display 1 in the second mode. Accordingly, the user can set the electronic device 1000 to operate in the first mode or the second mode by using the mode setting unit 1070. The controller 1010 controls the light source module 1020 to provide the light source to the one or none of the unstable display 1 and the bi-stable display 2 operated by the user according to the detecting result of the photo sensor 1050 or the gyroscope 1060.

For example, if the electronic device 1000 is set to operate in the first mode by the mode setting unit 1070, the detecting result of the gyroscope 1060 may indicate that the user lies face-down on a bed, sit or stand while operating the unstable display 1. In the meanwhile, the controller 1010 controls the light source module 1020 to provide the light source to the unstable display 1 operated by the user according to the detecting result of the gyroscope 1060. On the contrast, the detecting result of the gyroscope 1060 may indicate that the user lies face-up on the bed while operating the bi-stable display 2 in the first mode. The controller 1010 controls the light source module 1020 to provide the light source to the bi-stable display 2 operated by the user according to the detecting result of the gyroscope 1060 in this case. If the bi-stable display 2 is used by the user, the photo sensor 1050 senses an ambient light. If the ambient light is weak, the controller 1010 increases the power of the light source module 1020. If the ambient light is strong enough, the controller 1010 turns off the light source module 1020. Furthermore, the operation of the electronic device 1000 under the second mode may be deduced by analogy according to the first mode, and it will be not described again herein.

Please further direct to FIGS. 2A and 2B, which are diagrams illustrating a second embodiment of the electronic device according to the disclosure. The first surface 202 of the first host 201a of the electronic device 200 has an unstable display 1 and the front surface 203 of the second host 201b has a bi-stable display 2. The first host 201a and the second host 201b are rotatably connected with each other by a rotating mechanism 205, such as a pivot component or a hinge component and in the meanwhile, the first host 201a and the second host 201b are also electronically connected with each other.

The above-mentioned bi-stable display 2 can be optionally disposed on the back side 204 of the second host 201b. That is the bi-stable display 2 can be disposed on the front side 203 or the back side 204 opposite to the front side 203. Alternatively, two bi-stable displays 2 can be disposed on both front side 203 and back side 204 of the second host 201b at the same time. In addition, the bi-stable display 2 can be disposed on one of front side 203 and the back side 204 and an unstable display 1 is then disposed on the other one. Several function components, such as an expansion slot and a volume bottom, may be further disposed on the second host 201b. Specifically, the electronic device 200 may be a foldable electronic device or a twistable electronic device, for instance, a foldable cell phone or a twistable cell phone.

On the other hand, the electronic device 200 may further include a light source module for providing a light source to one or none of the unstable display 1 and the bi-stable display 2. The light source module may include at least one light emitting device for providing the light source. The at least one light emitting device may be arranged inside the rotating mechanism 205 in one exemplary embodiment. The light source module arranged in the electronic device 200 of the disclosure is sufficiently taught, suggested, and embodied in the embodiments illustrated in FIG. 1C to FIG. 1G, and therefore no further description is provided herein.

Figure 3A:
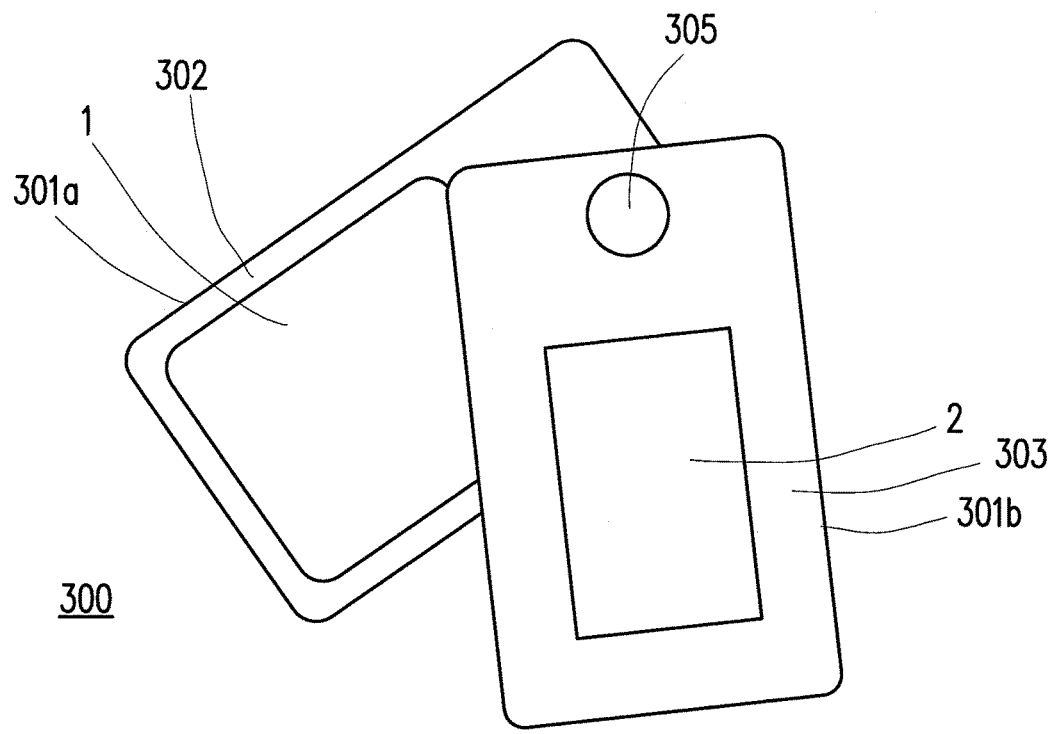
FIGS. 3A and 3B are diagrams illustrating a third embodiment of the electronic device according to the disclosure.

On the basis of the above-mentioned second embodiment of the electronic device, a third embodiment of the electronic device is correspondingly derived. Please direct to FIG. 3A, which is a diagram illustrating a third embodiment of the electronic device according to the disclosure. The front surface 302 of the first host 301a of the electronic device 300 has an unstable display 1 and the back surface 303 of the second host 301b has a bi-stable display 2. The first body 301a and the second body 301b are rotatably connected with each other by a rotating mechanism 305, such as a pivot component or a hinge component and in the meanwhile, the first body 301a and the second body 301b are also electronically connected with each other.

The above-mentioned bi-stable display 2 can be optionally disposed on the front surface (not shown in FIG. 3A) of the second body 301b. That is the bi-stable display 2 can be disposed on the back surface 303 or the front surface opposite to the back surface 303. Alternatively, two bi-stable displays 2 can be disposed on both back surface 303 and front surface of the second body 301b at the same time. In addition, the bi-stable display 2 can be disposed on one of back surface 303 and front surface and an unstable display 1 is then disposed on the other one. In addition to display information, the bi-stable display 2 in the third embodiment of the electronic device could be duly configured as an identification for the electronic device 300 which operates with respect to the order transmitted from the digital processing module in the electronic device 300. Specifically, the electronic device 300 may be a rotatable electronic device or a twistable electronic device, for instance a commonly twistable cell phone.

Figure 3B:
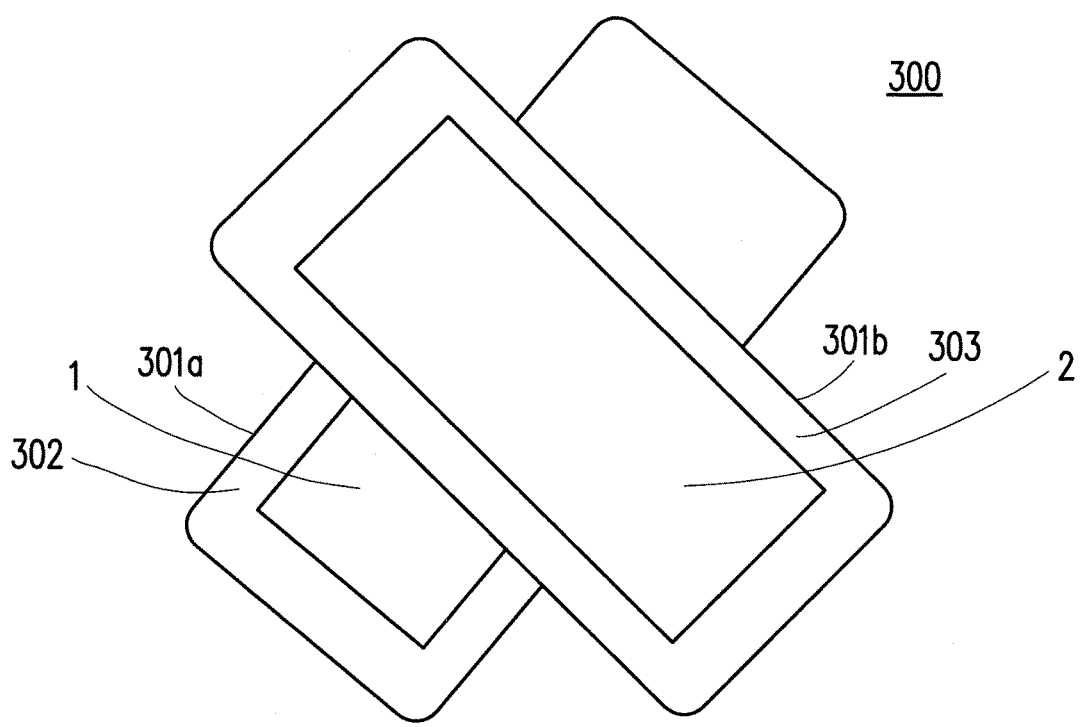

It is noted that the rotating mechanism 305 is not limited to be disposed at position approximate to the edge of the first host 301a and the second host 301b. The rotating mechanism 305 can also be disposed at position approximate to the center of the first host 301a and the second host 301b, which is shown in FIG. 3B.

Figure 4:
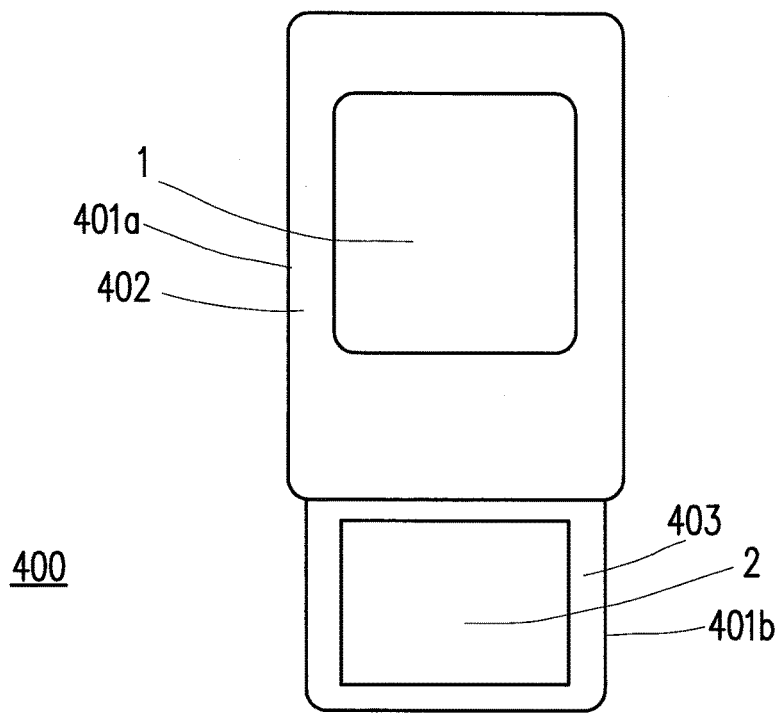
FIG. 4 is a diagram illustrating a fourth embodiment according to the disclosure.
Figure 5:
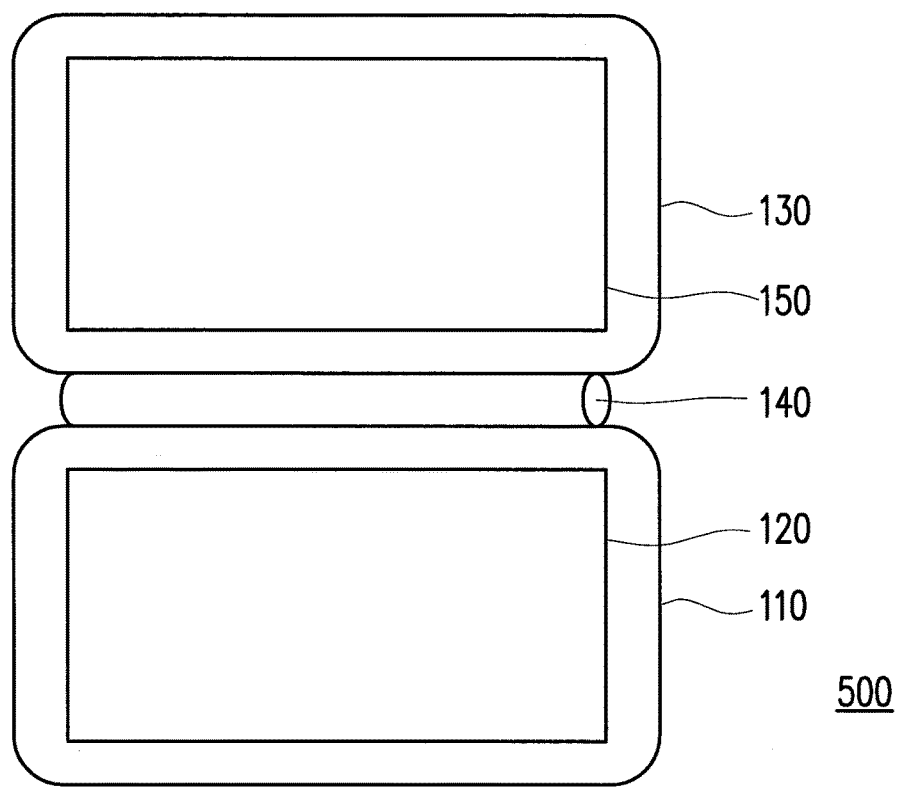
FIG. 5 is a diagram illustrating the representative drawing for Taiwan Patent No. 1309711.

Please resume directing to FIG. 4, which is a diagram illustrating a fourth embodiment according to the disclosure. The first surface 402 of the first host 401a of the electronic device 400 has an unstable display 1 and the front surface 403 of the second host 401b has a bi-stable display 2. The first host 401a and the second host 401b are slidably connected with each other by a slidable mechanism (not shown in FIG. 4), such as a track suite or a slidable track suite and in the mean time, the first host 401a and the second host 401b are also electronically connected with each other.

The above-mentioned bi-stable display 2 can be optionally disposed on the back surface (not shown in FIG. 4) of the second host 401b. That is the bi-stable display 2 can be disposed on the front surface 403 or the back surface opposite to the front surface 403. Alternatively, two bi-stable displays 2 can be disposed on both front surface 403 or back surface of the second host 401b at the same time. In addition, the bi-stable display 2 can be disposed on one of the front surface 403 or the back surface and an unstable display 1 is then disposed on the other one. Specifically, the electronic device 400 may be a slidable electronic device, for instance a commonly slidable cell phone or a slidable electronic dictionary. The appearance of the slidable electronic dictionary is a transverse elongated rectangular.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:
1. An electronic device, comprising:
a body having a side on which an unstable display is disposed and another side on which a bi-stable display is disposed; and
a light source module arranged inside the body and configured to provide a light source to one or none of the unstable display and the bi-stable display, wherein the light source module comprises:
a first light guide plane and a second light guide planes respectively arranged on the side on which the unstable bi-stable display is disposed and between the unstable display and the bi-stable display for receiving the light source;
a second light guide plane arranged between the unstable display and the bi-stable display for receiving the light source;

a first light emitting device configured to provide the light source to one of the first and the second light guide planes;
a first and a second switchable light shelters respectively arranged between the first light emitting device and the first light guide plane and between the first light emitting device and the second light guide plane; and
a light control module, arranged inside the body and having a controller and at least a sensor electrically connected with each other, wherein the light control module is configured to sense which one of the unstable display and the bi-stable display a user operates and control the light source module to provide the light source to the one or none of the unstable display and the bi-stable display operated by the user.

2. The electronic device according to claim 1 further comprising a switching element configured on the body and switching the unstable display and the bi-stable display to operate between a synchronization mode and a non-synchronization mode.

3. The electronic device according to claim 1, wherein the body further has an electronic computing module therein.

4. The electronic device according to claim 3, wherein the electronic computing module further comprises a processor processing a received data and a storing medium storing one of the received data and a processed data.

5. The electronic device according to claim 1, wherein the another side is one of an opposite side opposite to the side and an edge side beside to the side.

6. The electronic device according to claim 1, wherein the bi-stable display is one selected from a group consisting of a bi-stable liquid crystal display, a micro-electro-mechanical system display, an electrophoretic display, a reflective-display, an electrowetting display, an electronic paper and a combination thereof.

7. The electronic device according to claim 1, wherein the unstable display is one selected from a group consisting of an unstable liquid crystal display, an organic light emitting diode display, a plasma display and a combination thereof.

8. The electronic device according to claim 1, wherein each of the bi-stable display and the unstable display is one selected from a group consisting of a touch-based display, a flexible display and a soft display.

9. The electronic device according to claim 1 being one selected from a group consisting of a notebook computer, a digital camera, a personal digital assistance, a global positioning system, an electronic book, a mobile communication equipment, an audio-video player, a portable electronic device, a miniature computing device, a digitalized processing device and a handheld electronic device.

10. An electronic device, comprising:
a first body having a first surface disposing thereon a first unstable display;
a second body rotatably connected with the first body and having a second surface disposing thereon a first bi-stable display; and
a light source module arranged beside the first and the second bodies and configured to provide a light source to one or none of the first unstable display and the first bi-stable display, wherein the light source module comprises:
a first light guide plane and a second light guide planes respectively arranged on the second surface and between the first unstable display and the first bi-stable display for receiving the light source;
a second light guide plane arranged between the first unstable display and the first bi-stable display for receiving the light source;
a first light emitting device configured to provide the light source to one of the first and the second light guide planes;
a first and a second switchable light shelters respectively arranged between the first light emitting device and the first light guide plane and between the first light emitting device and the second light guide plane; and
a light control module, arranged inside the body and having a controller and at least a sensor electrically connected with each other, wherein the light control module is configured to sense which one of the unstable display and the bi-stable display a user operates and control the light source module to provide the light source to the one or none of the unstable display and the bi-stable display operated by the user.

11. The electronic device according to claim 10, wherein the second body is electrically connected with the first body.

12. The electronic device according to claim 10, wherein the second body further comprises a third surface opposite to the second surface disposing thereon one of a second unstable display and a second bistable display.

13. The electronic device according to claim 12, wherein one of the first and the second bi-stable displays is configured as an identification.

14. The electronic device according to claim 10 being one of a foldable electronic device or a twistable electronic device.

15. The electronic device according to claim 14, wherein the foldable electronic device is a foldable mobile phone and the twistable electronic device is a twistable mobile phone.

16. The electronic device according to claim 10, further comprising:
a rotating mechanism rotatably connecting the first body and the second body, wherein the first light emitting device is arranged inside the rotating mechanism.

17. The electronic device according to claim 1, wherein the light control module comprises:
a first sensor disposed on the another side on which the bi-stable display is disposed and configured to sense an ambient light, and the controller electrically connected to the first sensor and configured to determine whether the light source module provides the light source to the bi-stable display operated by the user according to the sensing result of the first sensor.

18. The electronic device according to claim 17, wherein the light control module further comprises:
a mode setting unit electrically connected to the controller and configured to set the electronic device to operate in a first mode or a second mode,
wherein in the first mode, the unstable display faces away from a gravity direction, and in the second mode, the bi-stable faces away from the gravity direction.

19. The electronic device according to claim 18, wherein the light control module further comprises:
a second sensor disposed on the side on which the unstable display is disposed and configured to detect a direction perpendicular to the unstable display with respect to the gravity direction,
wherein the controller is further electrically connected to the second sensor and configured to control the light source module to provide the light source to the one of the unstable display and the bi-stable display operated by the user according to the detecting result of the second sensor.

20. The electronic device according to claim 19, wherein the light control module further comprises:
a third sensor disposed on the another side on which the bi-stable display is disposed and configured to detect a direction perpendicular to the bi-stable display with respect to the gravity direction,
wherein the controller is further electrically connected to the third sensor and configured to control the light source module to provide the light source to the one of the unstable display and the bi-stable display operated by the user according to the detecting result of the third sensor.

21. The electronic device according to claim 20, wherein the light control module further comprises:
a fourth sensor disposed on the side on which the unstable display is disposed and configured to sense whether the unstable display is operated by the user,
wherein the first sensor is further configured to sense whether the bi-stable display is operated by the user, and the controller is further electrically connected to the fourth sensor and configured to control the light source module to provide the light source to the one or none of the unstable display and the bi-stable display operated by the user according to the detecting result of the first sensor or the fourth sensor.

22. The electronic device according to claim 10, wherein the light control module comprises:
a first sensor disposed on the second surface and configured to sense an ambient light, and the controller electrically connected to the first sensor and configured to determine whether the light source module provides the light source to the first bi-stable display operated by the user according to the sensing result of the first sensor.

23. The electronic device according to claim 22, wherein the light control module further comprises:
a mode setting unit electrically connected to the controller and configured to set the electronic device to operate in a first mode or a second mode,
wherein in the first mode, the first unstable display faces away from a gravity direction, and in the second mode, the first bi-stable display faces away from the gravity direction.

24. The electronic device according to claim 23, wherein the light control module further comprises:
a second sensor disposed on the first body and configured to detect a direction perpendicular to the first unstable display with respect to the gravity direction,
wherein the controller is further electrically connected to the second sensor and configured to control the light source module to provide the light source to the one of the first unstable display and the first bi-stable display operated by the user according to the detecting result of the second sensor.

25. The electronic device according to claim 24, wherein the light control module further comprises:
a third sensor disposed on the second body and configured to detect a direction perpendicular to the first bi-stable display with respect to the gravity direction,
wherein the controller is further electrically connected to the third sensor and configured to control the light source module to provide the light source to the one of the first unstable display and the first bi-stable display operated by the user according to the detecting result of the third sensor.

26. The electronic device according to claim 25, wherein the light control module further comprises:
a fourth sensor disposed on the first surface and configured to sense whether the first unstable display is operated by the user,
wherein the first sensor is further configured to sense whether the first bi-stable display is operated by the user, and the controller is further electrically connected to the fourth sensor and configured to control the light source module to provide the light source to the one or none of the first unstable display and the first bi-stable display operated by the user according to the detecting result of the first sensor or the fourth sensor.

* * * * *